(12) United States Patent
Jonas et al.

(10) Patent No.: US 10,493,676 B2
(45) Date of Patent: Dec. 3, 2019

(54) ARM REST FRAME, ARM REST AND METHOD FOR PRODUCING AN ARM REST FRAME

(71) Applicant: Adient Luxembourg Holding S.à r.l., Luxembourg (LU)

(72) Inventors: Jörg Jonas, Wülfrath (DE); Bernd Meier, Attendorn (DE); Michal Martinka, Nove Mesto n. V (SK); Ronny Mueller, Erftstadt (DE); Lutz Wege, Solingen (DE)

(73) Assignee: ADIENT LUXEMBOURG HOLDING S.À R.L., Luxembourg (LU)

( * ) Notice: Subject to any disclaimer, the term of this patent is extended or adjusted under 35 U.S.C. 154(b) by 104 days.

(21) Appl. No.: 15/113,131

(22) PCT Filed: Jan. 21, 2015

(86) PCT No.: PCT/EP2015/051160
§ 371 (c)(1),
(2) Date: Jul. 21, 2016

(87) PCT Pub. No.: WO2015/110482
PCT Pub. Date: Jul. 30, 2015

(65) Prior Publication Data
US 2017/0008431 A1    Jan. 12, 2017

(30) Foreign Application Priority Data
Jan. 21, 2014 (DE) .......... 10 2014 201 033

(51) Int. Cl.
*B29C 45/14* (2006.01)
*B60N 2/75* (2018.01)
(Continued)

(52) U.S. Cl.
CPC .... *B29C 45/1418* (2013.01); *B29C 45/14786* (2013.01); *B60N 2/686* (2013.01);
(Continued)

(58) Field of Classification Search
CPC ...... B60N 2/4606; B60N 2/4613; B60N 2/46; B60N 2/753; B60N 2/757; B60N 2/75;
(Continued)

(56) References Cited

U.S. PATENT DOCUMENTS 2,042,587 A   6/1936 Chadwick
6,821,613 B1 * 11/2004 Kagi ............... B29C 70/081
                                            428/292.1
(Continued)

FOREIGN PATENT DOCUMENTS

CN     102 548 796 A    7/2012
CN     103 097 190 A    5/2013
(Continued)

OTHER PUBLICATIONS

Chinese Office Action dated Apr. 5, 2017.

*Primary Examiner* — David R Dunn
*Assistant Examiner* — Tania Abraham
(74) *Attorney, Agent, or Firm* — McGlew and Tuttle, P.C.

(57) ABSTRACT

An arm rest frame (1) includes at least one frame component (7, 8, 9, 11). The at least one frame component (7, 8, 9, 11) is made from a organosheet. An arm rest and a method for producing an arm rest frame (1) are also provided.

17 Claims, 5 Drawing Sheets

(51) Int. Cl.
*B60N 2/68* (2006.01)
*B29K 105/08* (2006.01)
*B29K 105/00* (2006.01)
*B29K 101/12* (2006.01)
*B29L 31/30* (2006.01)
*B29K 309/08* (2006.01)

(52) U.S. Cl.
CPC ............ *B60N 2/753* (2018.02); *B60N 2/757* (2018.02); *B60N 2/793* (2018.02); *B29K 2101/12* (2013.01); *B29K 2105/0845* (2013.01); *B29K 2105/256* (2013.01); *B29K 2309/08* (2013.01); *B29L 2031/3026* (2013.01)

(58) Field of Classification Search
CPC ...... B60N 2/686; B60N 2/4686; B60N 2/793; B29C 45/1418
See application file for complete search history.

(56) References Cited

U.S. PATENT DOCUMENTS

| | | |
|---|---|---|
| 9,327,434 B2 | 5/2016 | Zynda et al. |
| 2010/0207441 A1 | 8/2010 | Senges et al. |
| 2011/0020572 A1* | 1/2011 | Malek ................ B32B 27/08 |
| | | 428/35.7 |
| 2011/0298243 A1* | 12/2011 | Auer ................ B62D 25/2036 |
| | | 296/191 |
| 2017/0015223 A1* | 1/2017 | Raab ................ B60N 3/102 |

FOREIGN PATENT DOCUMENTS

| | | |
|---|---|---|
| CN | 103 144 561 A | 6/2013 |
| JP | 2000 070070 A | 3/2000 |
| KR | 10-1049454 B1 | 7/2011 |
| WO | 03/016091 A1 | 2/2003 |
| WO | 2012/032189 A1 | 3/2012 |
| WO | 2013/127972 A2 | 9/2013 |

* cited by examiner

ARM REST FRAME, ARM REST AND METHOD FOR PRODUCING AN ARM REST FRAME

CROSS REFERENCE TO RELATED APPLICATIONS

This application is a U.S. National Phase Application of International Application PCT/EP2015/051160 filed Jan. 21, 2015 and claims the benefit of priority under 35 U.S.C. § 119 of German Application 10 2014 201 033.0 filed Jan. 21, 2014, the entire contents of which are incorporated herein by reference.

FIELD OF THE INVENTION

The invention relates to an arm rest frame comprising at least one frame component.

The invention further relates to an arm rest comprising such an arm rest frame.

The invention further relates to a method for producing an arm rest frame comprising at least one frame component.

BACKGROUND OF THE INVENTION

Generally, arm rests for vehicles which comprise an arm rest frame formed from a plurality of components and provided with a cover are known from the prior art. Moreover, methods for producing arm rests and arm rest frames are known.

KR10-1049454 B1 discloses an arm rest frame having a plurality of frame components which are produced together in an injection-molding method and which are formed from a reinforced cast resin composite material. A method for producing the arm rest frame and an arm rest comprising such an arm rest frame is also disclosed. The arm rest further comprises an articulated joint arrangement formed from metal, the arm rest being able to be arranged so as to be foldable thereby on a seat backrest of a vehicle seat.

SUMMARY OF THE INVENTION

It is an object of the present invention to specify an arm rest frame which is improved relative to the prior art, an arm rest comprising such an arm rest frame and an improved method for producing an arm rest frame.

The arm rest frame, in particular for an arm rest of a vehicle, comprises at least one frame component. According to the invention, the at least one frame component is formed from an organosheet.

In the present case organosheets are understood as endless fiber-reinforced thermoplastic panels. In other words, organosheets are so-called fiber matrix semi-finished products which comprise a woven fiber fabric or laid fiber fabric embedded in a thermoplastic matrix.

The advantages of the thermoplastic matrix are in the capacity of the semi-finished products to be hot-formed and the resulting shorter process times in comparison with conventional thermosetting fiber composite materials and metal materials. This results in particularly short process times. Also, by selecting woven fiber fabrics or laid fiber fabrics the mechanical properties, such as for example the stiffness, strength and thermal expansion of the organosheet and thus of the frame component, are able to be set more easily and in a very accurate manner than with metal components.

Thus, relative to arm rest frames known from the prior art and formed from metal frame components, a significant reduction in the weight of the arm rest frame may be achieved with the same or improved mechanical stability.

According to one possible development of the arm rest frame, a rib structure is formed on the frame component configured as an organosheet, said rib structure, for example, being integrally formed in an injection-molding tool so that a material connection is formed between the organosheet and the rib structure, whereby an integral component is formed. Since the organosheet comprises a thermoplastic matrix, it is able to be fused and encapsulated by being injection-molded with the same thermoplastic material. Here a distinction is made between the two methods. In the first method, preformed organosheets are introduced into an injection-molding tool and encapsulated by being injection-molded with the thermoplastic material. In the second method, the shaping of the organosheet takes place directly in the injection-molding tool. With the greater strength and stiffness of the frame component, the rib structure permits a lower component weight in comparison with conventional frame components, in particular formed from metal.

In one possible embodiment of the arm rest frame, at least one axle body is arranged on the frame component for forming a pivot axis. Thus, an arm rest comprising the arm rest frame is pivotable about at least one pivot axis.

The arm rest according to the invention, in particular for a vehicle, comprises an arm rest frame according to the invention or developments thereof. Thus, relative to the arm rests known from the prior art, the arm rest is characterized by a significantly reduced weight with the same or improved mechanical stability. At the same time, the arm rest may be produced very cost-effectively due to the short process times.

In the method for producing an arm rest frame, in particular for an arm rest of a vehicle, at least one frame component of the arm rest frame is formed from an organosheet. Due to the formation of the frame component from the organosheet the method is characterized by particularly short process times. In this case, by selecting the woven fiber fabric or laid fiber fabric the mechanical properties of the organosheet and thus of the frame component may be adjusted more easily and very accurately.

According to one possible development of the method, at least one frame component of the arm rest frame is produced in a so-called "one shot method". In this case, the component is heated and preshaped in an injection-molding tool and encapsulated by being injection-molded with a thermoplastic material. Thus, a material connection may be formed in a simple manner between the organosheet and the thermoplastic material, whereby a single homogenous component is formed without joints, with a high level of mechanical stability.

In one possible embodiment, in the one shot method a rib structure is formed by the thermoplastic material, so that a material connection is formed between the organosheet and the rib structure. By means of the rib structure a stability of the frame component is increased, with lower weight. Thus, without negative effects on the strength and stiffness of the frame component the component weight may be significantly reduced in comparison with conventional frame components, in particular frame components formed from metal. Moreover, the method is characterized by a particularly low number of process steps during production, so that the productivity is increased and the unit costs are reduced.

In a further possible embodiment, at least one connection geometry, for example a receiver for an axle body for forming at least one pivot axis and/or at least one fastening geometry, is shaped and/or integrally formed during the shaping of the organosheet. This production of the connection geometry during the shaping process permits a further reduction of the process steps when producing the arm rest frame.

Exemplary embodiments of the invention are described in more detail hereinafter with reference to the drawings. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, parts which correspond to one another are provided in all of the Figures with the same reference numerals.

FIGS. 1 to 7 show in a perspective view an upper part (FIG. 1) and a lower part (FIG. 2) of an arm rest frame 1' (FIG. 3) as well as the arm rest frame 1' for an arm rest according to the prior art. The arm rest in this case is provided for use inside a vehicle. In this case the arm rest is configured to be foldable. For producing this folding mechanism two axle bodies 2', 3' are able to be fixedly arranged on the vehicle, wherein the arm rest in its entirety is pivotable about a first pivot axis predetermined by the axle bodies 2', 3'. For producing this folding mechanism, the two axle bodies 2', 3' are able to be fixedly arranged on the vehicle, in each case by one fastening element 4', 5'.

Figure 1:
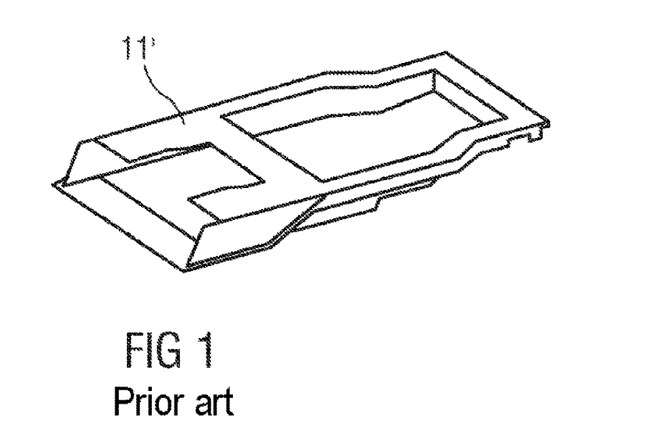
FIG. 1 is a schematic perspective view of an upper part of an arm rest frame according to the prior art.
Figure 2:
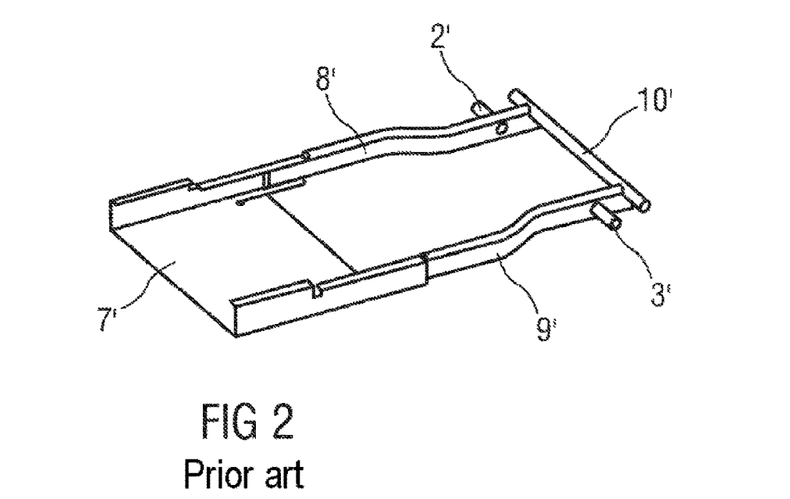
FIG. 2 is a schematic perspective view of a lower part of an arm rest frame according to the prior art.
Figure 3:
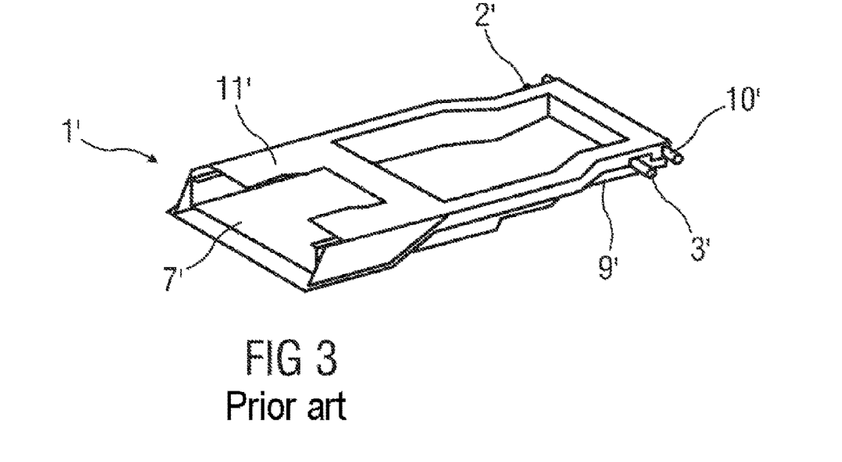
FIG. 3 is a schematic perspective view of an arm rest frame formed from the upper part and the lower part according to FIGS. 1 and 2 according to the prior art.
Figure 4:
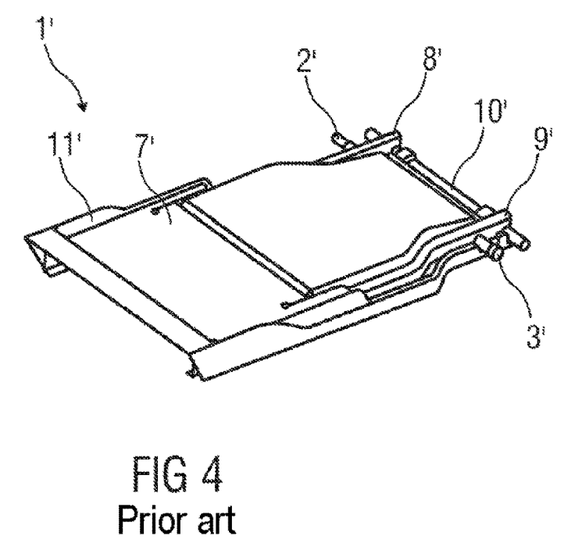
FIG. 4 is a schematic perspective view of an arm rest frame according to the prior art.
Figure 5:
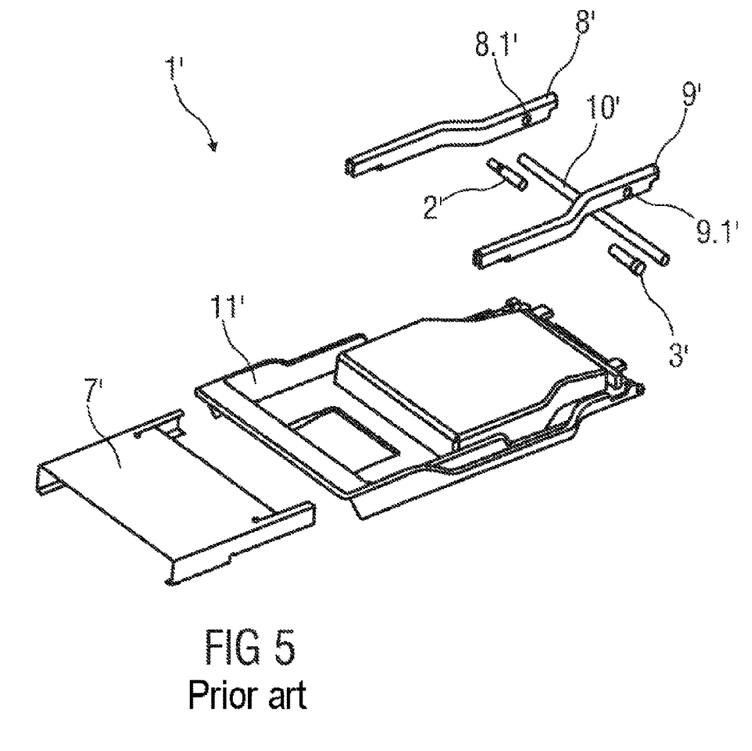
FIG. 5 is a schematic exploded view of the arm rest frame according to FIG. 4.
Figure 6:
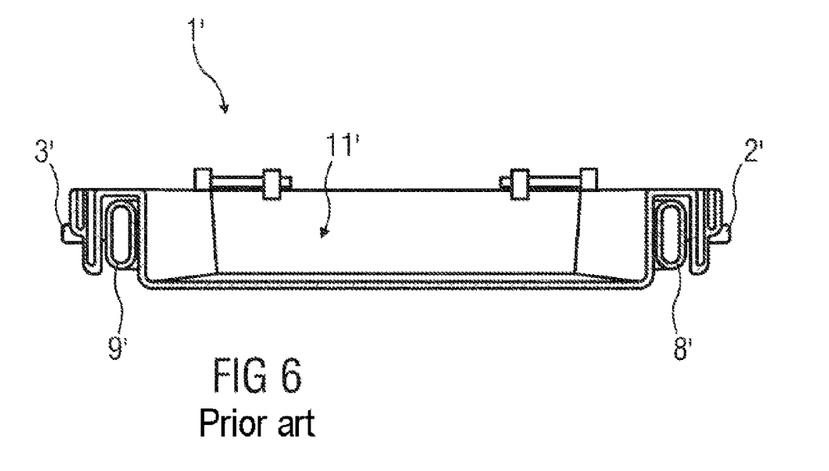
FIG. 6 is a schematic cross section of the arm rest frame according to FIG. 4.
Figure 7:
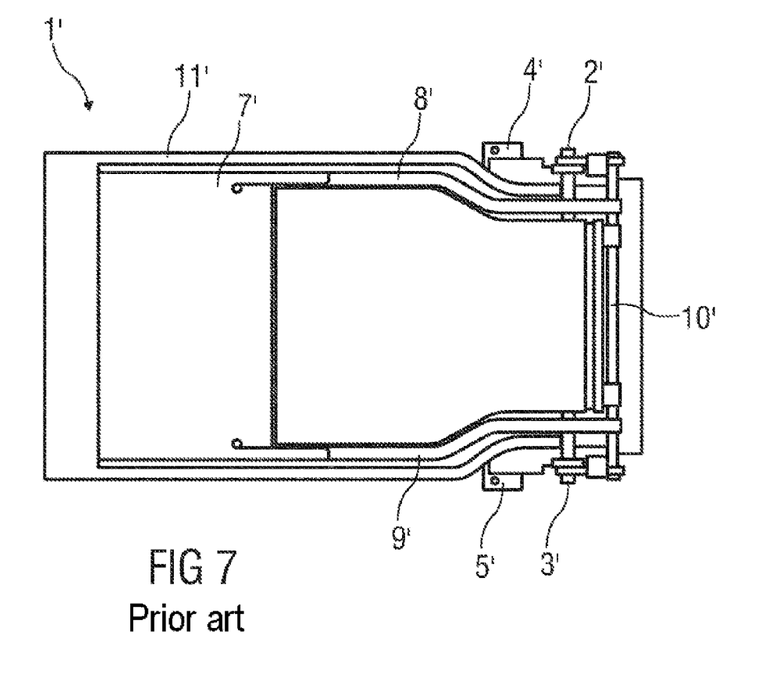
FIG. 7 is a schematic plan view of the arm rest frame according to FIG. 4.
Figure 8:
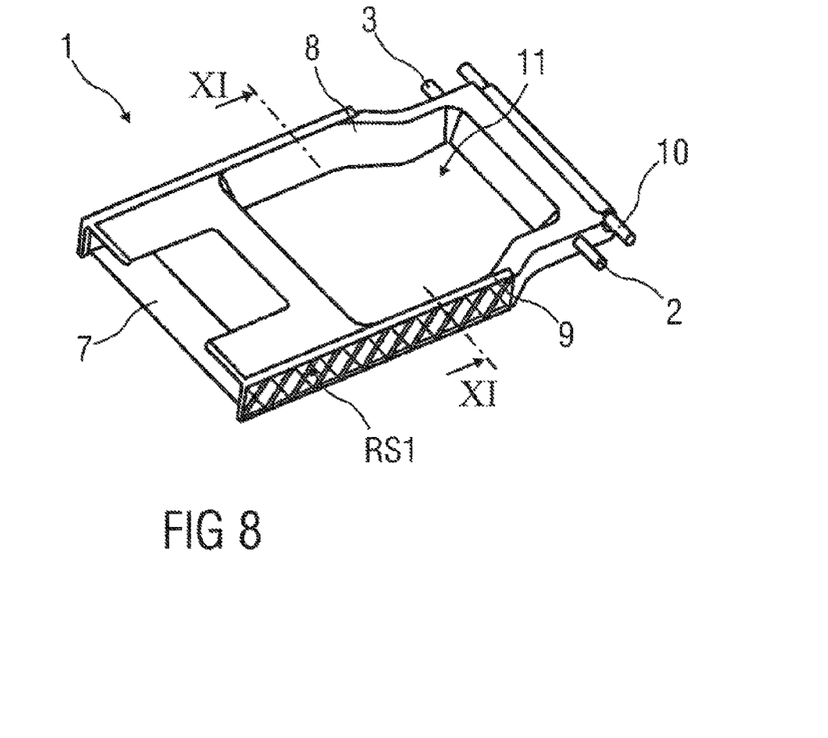
FIG. 8 is a schematic first perspective view of an exemplary embodiment of an arm rest frame according to the invention.
Figure 9:
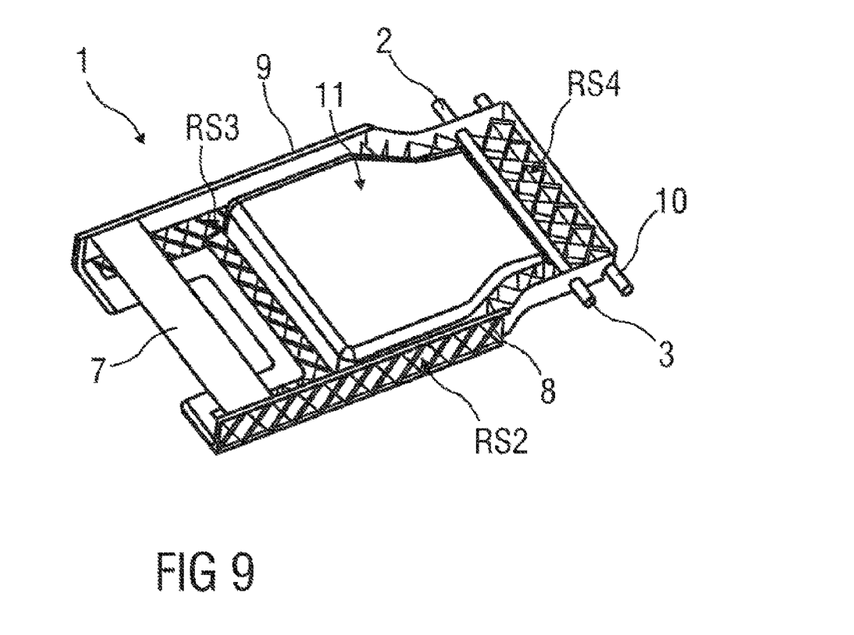
FIG. 9 is a schematic second perspective view of the arm rest frame according to FIG. 8.
Figure 10:
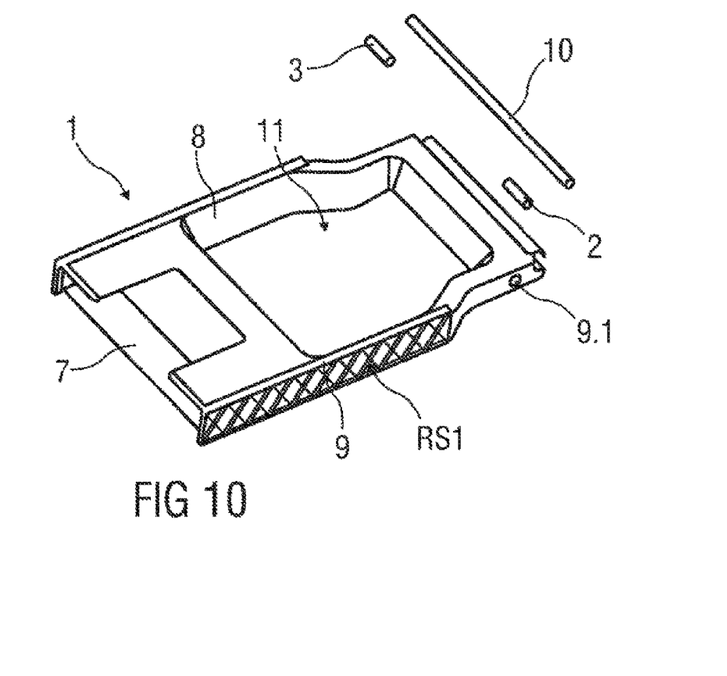
FIG. 10 is a schematic exploded view of the arm rest frame according to FIG. 8.
Figure 11:
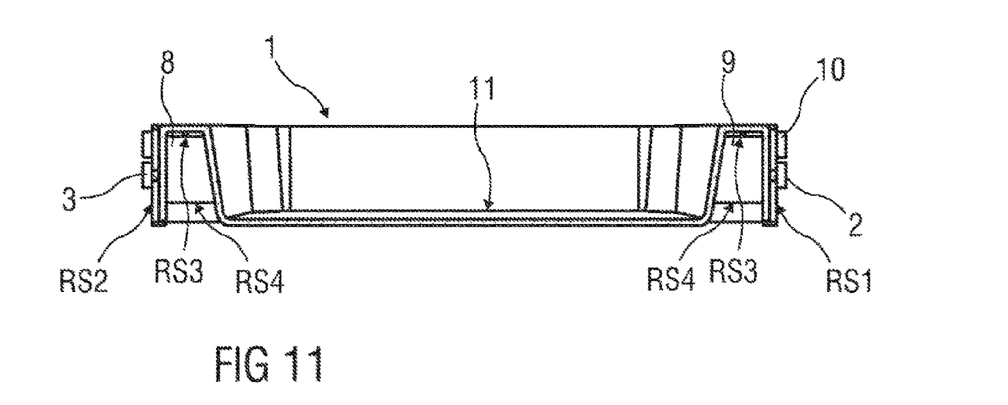
FIG. 11 is a schematic sectional view of the arm rest frame according to FIG. 8.

The lower part of the arm rest frame 1' is formed from a first frame component 7' as well as a second frame component 8' connected thereto and a third frame component 9', wherein the second and third frame components 8', 9' are in each case configured as a cranked profile element and are fixedly connected to the first frame component 7'.

Additionally, a further axle body 10' which is configured as a stop element is provided for limiting a pivoting path and thus a pivoting angle of the arm rest about the axle bodies 2', 3'. The frame components 7', 8', 9' and the axle bodies 2', 3', 10' in this case are formed from metal, in particular welded together, and form a load-bearing structure for the arm rest.

The further axle body 10' in this case is arranged on the upper part of the arm rest frame 1', wherein the upper part of the arm rest frame 1' is formed from a fourth frame component 11'. The fourth frame component 11' is configured, for example, as a plastics injection-molded part and forms a storage compartment of the arm rest. Moreover, the fourth frame component 11' is configured for fastening further components of the arm rest, not shown in more detail, for example a storage compartment cover, a foam part, a cover, a can and/or bottle holder, a storage compartment and/or further components.

In FIGS. 8 to 11 a possible exemplary embodiment of an arm rest frame 1 according to the invention for an arm rest is shown in different views. The arm rest is in this case provided for use inside a vehicle between two front seats or two rear seats. In particular, the arm rest is configured to be foldable. For producing this folding mechanism, two axle bodies 2, 3 are able to be fixedly arranged on the vehicle, wherein the arm rest in its entirety is pivotable about a first pivot axis predetermined by the axle bodies 2, 3. A further axle body 10 is configured as a stop element for limiting a pivoting path and thus a pivoting angle of the arm rest about the axle bodies 2', 3'.

In contrast to the arm rest frame 1' according to the prior art, shown in FIGS. 1 to 7, the arm rest frame 1 comprises frame components 8, 9, 11 which are formed from a so-called organosheet.

The organosheet is a conventional organosheet. An organosheet is a planar semi-finished product made from a thermoplastic material, a woven fabric made of glass fibers, carbon fibers and/or aramid fibers or a mixed form thereof being introduced therein such that the fibers are completely coated and enclosed by the thermoplastic material. Organosheets are thus endless fiber-reinforced thermoplastic panels. Organosheets may be shaped by heating and subsequent pressing in short cycle times to form three-dimensional components.

In this case, during the shaping process, different connection geometries, such as for example receivers 9.1 for the axle bodies 2, 3 and further fastening geometries, not shown in more detail, may be shaped or integrally formed in a particularly simple manner.

Thus, relative to the arm rest frame 1' according to the prior art shown in FIGS. 1 to 7, a significant simplification of the construction of the arm rest frame 1 may be achieved, wherein functions of the frame components 7 to 9, 11 are integrated in a common component. In this case, a high degree of weight-saving is achieved without impairing the mechanical stability.

In the exemplary embodiment shown, the frame components 8, 9, 11 are formed from an organosheet which, for example, has a thickness of 1.5 mm. In particular, the frame components 8, 9, 11 are formed from a one-piece organosheet, so that a homogenous component without joints may be formed, with a particularly high level of mechanical stability.

Moreover, rib structures RS1 to RS4 are formed on the frame components 8, 9, 11 formed from the organosheet, on a lower face and on outer side regions, wherein a material connection is formed between the organosheet and rib structure RS1 to RS4 so that an integral frame component 11 is formed.

In this case by means of the rib structures RS1 to RS4 partial reinforcements may be achieved by overmolding the organosheet. If specific load paths or force introduction points are subjected to high forces, these may be reinforced by additional overmolding, for example wall thickening and/or ribbing. Preferably the frame component 7 is also produced during this overmolding process, said frame component being provided as a transverse strut for mechanically stabilizing the frame components 8, 9 and connecting said components in a front region remote from the axle bodies 2, 3.

Moreover, a wall thickness may be reduced relative to conventional frame components, with the same load-bearing capacity. Thus, frame components 7 to 9 and 11 produced in this manner are advantageously reduced in weight and particularly flexurally rigid. In this case, a significant weight-saving of, for example, up to 30 percent relative to conventional frame components 7 to 9 and 11 for arm rests may be achieved.

In order to increase the strength and torsional stiffness further, the individual ribs are arranged so as to intersect within the rib structures RS1 to RS4. In this case an arrangement and/or a pattern of the rib structures RS1 to RS4, a height of the rib structures RS1 to RS4, a thickness of the ribs and the positions thereof are configured according to the load, i.e. adapted to a subsequent mechanical loading of the arm rest frame 1. In this case, the rib structures RS1 to RS4 in each case may have different heights, thicknesses and patterns, wherein both the height and the thickness of the ribs of the rib structures RS1 to RS4 may become gradually larger or smaller. Thus, in particular, with a variable height it is possible to compensate for free spaces of different heights between the frame elements 7 to 8, 11. Such different heights of the free spaces result, for example, from the different heights and arrangements of the frame elements 7 to 8, 11.

For example, the ribs of the rib structures RS1 to RS4 have a thickness of 2 mm.

In the exemplary embodiment shown, the rear face of the frame component 11 apart from the region forming the storage compartment is entirely provided with the rib structures RS3, RS4, wherein the rib structures RS3, RS4 are also configured for stabilizing between the region of the frame component 11 forming the storage compartment and the frame components 8, 9. The rib structures RS1, RS2 are in each case formed on an outer face of the frame components 8, 9.

In particular, the rib structures RS1 to RS4 are formed from a thermoplastic material which forms a material connection with the material of the organosheet.

In particular, the production of the frame components 7 to 8 and 11 takes place in a so-called "one shot method". In this case, a shaping of the organosheet and the production of the rib structures RS1 to RS4 is carried out by means of the injection-molding method in an injection-molding tool, by the thermoplastic matrix of the organosheet being fused in the injection-molding tool and, for example, being encapsulated by being injection-molded with the same thermoplastic material. In this manner, the rib structures RS1 to RS4 which consist, for example, of the same thermoplastic material as the organosheet are applied to the organosheet so that an integrated, and thus an integral, component which comprises the frame components 7 to 9 and 11 is formed from the organosheet and the rib structures RS1 to RS4. Also, by carrying out the so-called "one shot method" the number of tools and the number of processing steps are significantly reduced.

In the exemplary embodiment shown, the axle bodies 2, 3 are formed with a diameter of 10 mm from solid material and the axle body 10 is formed as a tube with an external diameter of 10 mm and a wall thickness of 1.5 mm. In this case, the axle bodies 2, 3 and 10 are formed, for example, from metal.

While specific embodiments of the invention have been shown and described in detail to illustrate the application of the principles of the invention, it will be understood that the invention may be embodied otherwise without departing from such principles.

The invention claimed is:

1. An arm rest frame comprising at least one frame component having an inner cavity surrounded by a ribbed structure, said inner cavity defining a storage compartment, said at least one frame component being formed from an organosheet material, wherein the ribbed structure is formed on the organosheet material, wherein inner edges define the inner cavity, outer edges define a space in which the ribbed structure is arranged, wherein the inner edges and the outer edges are formed by the organosheet material and the ribbed structure is formed by a thermoplastic material.

2. The arm rest frame as claimed in claim 1, wherein a material connection is formed between the organosheet material and the rib structure.

3. The arm rest frame as claimed in claim 1, wherein the organosheet material comprises a thermoplastic matrix.

4. The arm rest frame as claimed in claim 3, wherein the thermoplastic matrix and the ribbed structure are formed from the same material.

5. The arm rest frame as claimed in claim 1, wherein at least one axle body is arranged on the frame component for forming a pivot axis.

6. An arm rest comprising an arm rest frame comprising at least one frame component formed from an organosheet material, wherein the frame component has an inner cavity compartment surrounded by a ribbed structure, said inner cavity compartment defining a storage compartment, wherein the ribbed structure is formed on the organosheet material, wherein inner edges define the inner cavity, outer edges defining a space in which the ribbed structure is arranged, wherein the inner edges and the outer edges are formed by the organosheet material and the ribbed structure is formed by a thermoplastic material.

7. An arm rest as claimed in claim 6, wherein a material connection is formed between the organosheet material and the ribbed structure.

8. An arm rest as claimed in claim 6, wherein the organosheet material comprises a thermoplastic matrix.

9. An arm rest as claimed in claim 8, wherein the ribbed structure is formed on the organosheet material, and the thermoplastic matrix and the ribbed structure are formed from the same material.

10. An arm rest as claimed in claim 6, wherein at least one axle body is arranged on the frame component and forms a pivot axis.

11. An arm rest as claimed in claim 6, wherein the at least one frame component is formed by heating the organosheet material and subsequently shaping by pressing the heated organosheet material to form the frame component.

12. An arm rest as claimed in claim 11, wherein:
the rib structure is integrally formed on the organosheet material in an injection-molding tool; and
the organosheet material shaped to form the frame component is introduced into the injection-molding tool and at least partially encapsulated by being injection-molded with a thermoplastic material for producing the rib structure.

13. An arm rest frame comprising:
an arm rest frame structure comprising a frame component and a ribbed structure, the frame component comprising an inner cavity, the ribbed structure surrounding the frame component, the frame component comprising an organosheet material and the ribbed structure comprising a thermoplastic material, wherein the inner cavity defines a storage compartment, the frame component comprising a frame component edge, the frame component edge comprising the organosheet material, the frame component edge defining the inner cavity, the frame component edge and a lateral portion of the arm rest frame structure defining a portion of a space in which at least a portion of the ribbed structure is arranged.

14. The arm rest frame as claimed in claim 13, wherein a material connection is formed between the organosheet material and the ribbed structure.

15. The arm rest frame as claimed in claim 13, wherein the organosheet material comprises a thermoplastic matrix.

16. The arm rest frame as claimed in claim 15, wherein the thermoplastic matrix and the ribbed structure are formed from the same material.

17. The arm rest frame as claimed in claim 13, wherein at least one axle body is arranged on the frame component for forming a pivot axis.

\* \* \* \* \*